Feb. 18, 1936.  H. S. MORTON  2,031,120
STOKER CONTROLLING DEVICE
Filed Feb. 15, 1932  6 Sheets-Sheet 1
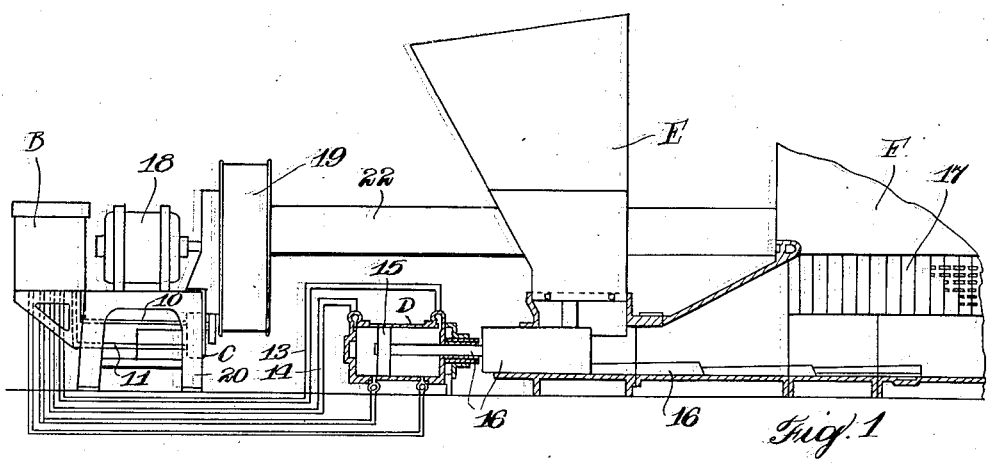
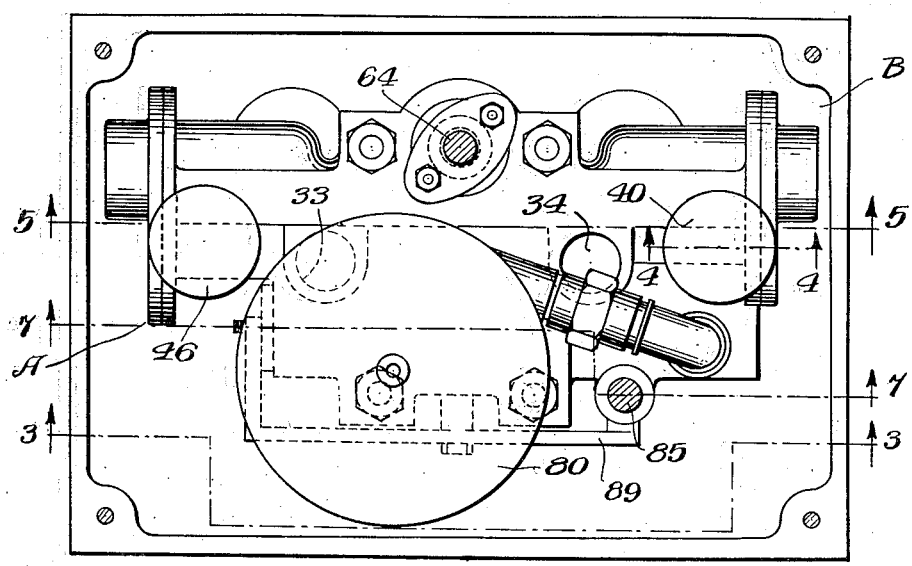
Fig. 1
Fig. 2
Inventor
Harold S. Morton
By
Attorney Feb. 18, 1936.  H. S. MORTON  2,031,120
STOKER CONTROLLING DEVICE
Filed Feb. 15, 1932  6 Sheets-Sheet 2

Inventor
Harold S. Morton
By Howard Fisher
Attorney

Feb. 18, 1936.   H. S. MORTON   2,031,120
STOKER CONTROLLING DEVICE
Filed Feb. 15, 1932   6 Sheets-Sheet 3

Inventor
Harold S. Morton
By Howard Rische
Attorney

Feb. 18, 1936. H. S. MORTON 2,031,120
STOKER CONTROLLING DEVICE
Filed Feb. 15, 1932 6 Sheets-Sheet 4
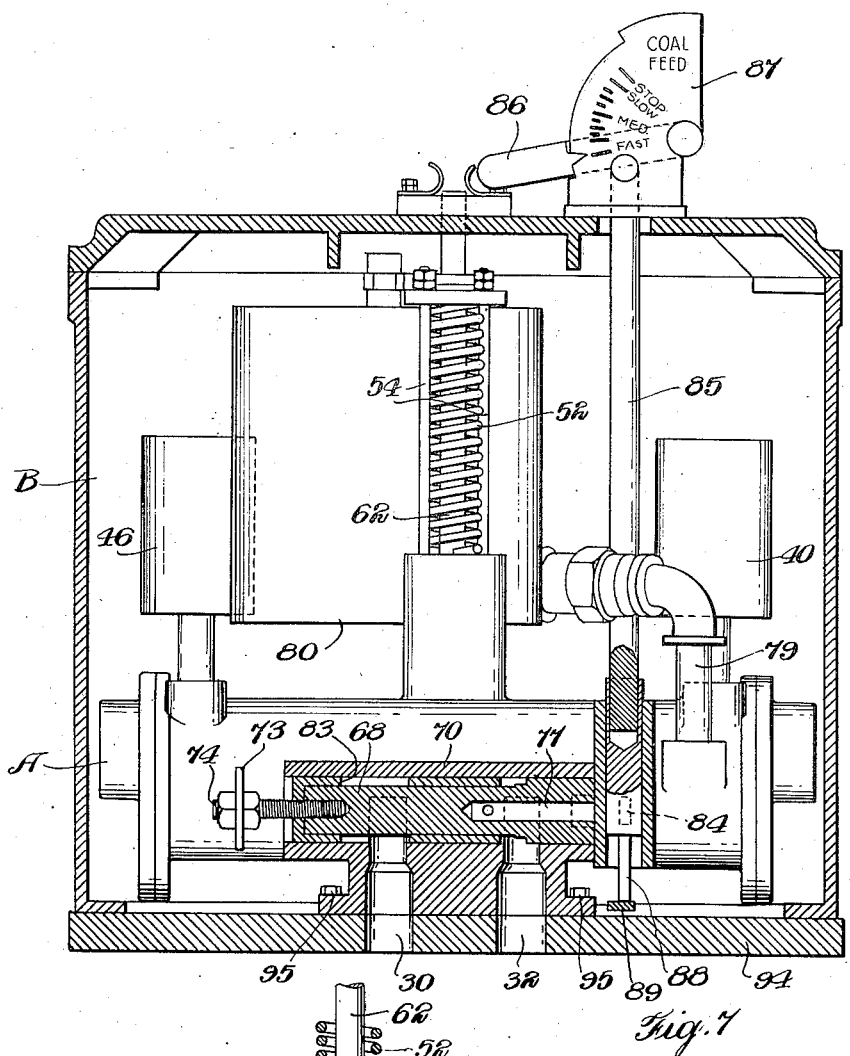
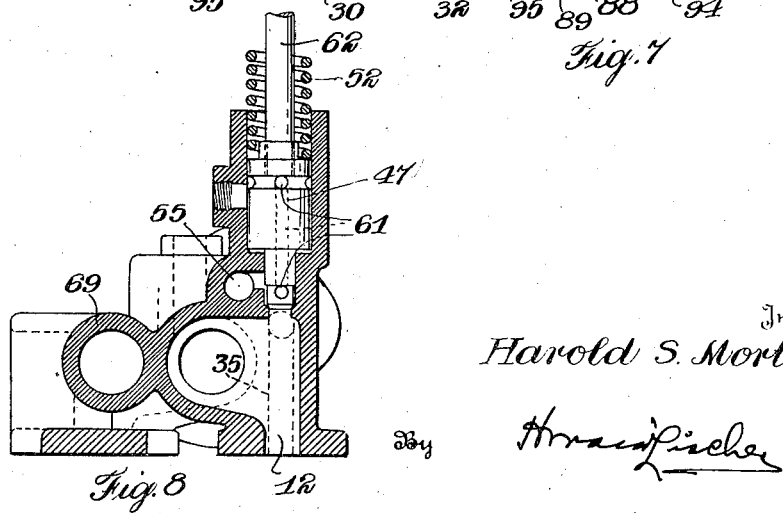
Inventor
Harold S. Morton
Attorney Feb. 18, 1936.  H. S. MORTON  2,031,120
STOKER CONTROLLING DEVICE
Filed Feb. 15, 1932  6 Sheets-Sheet 5
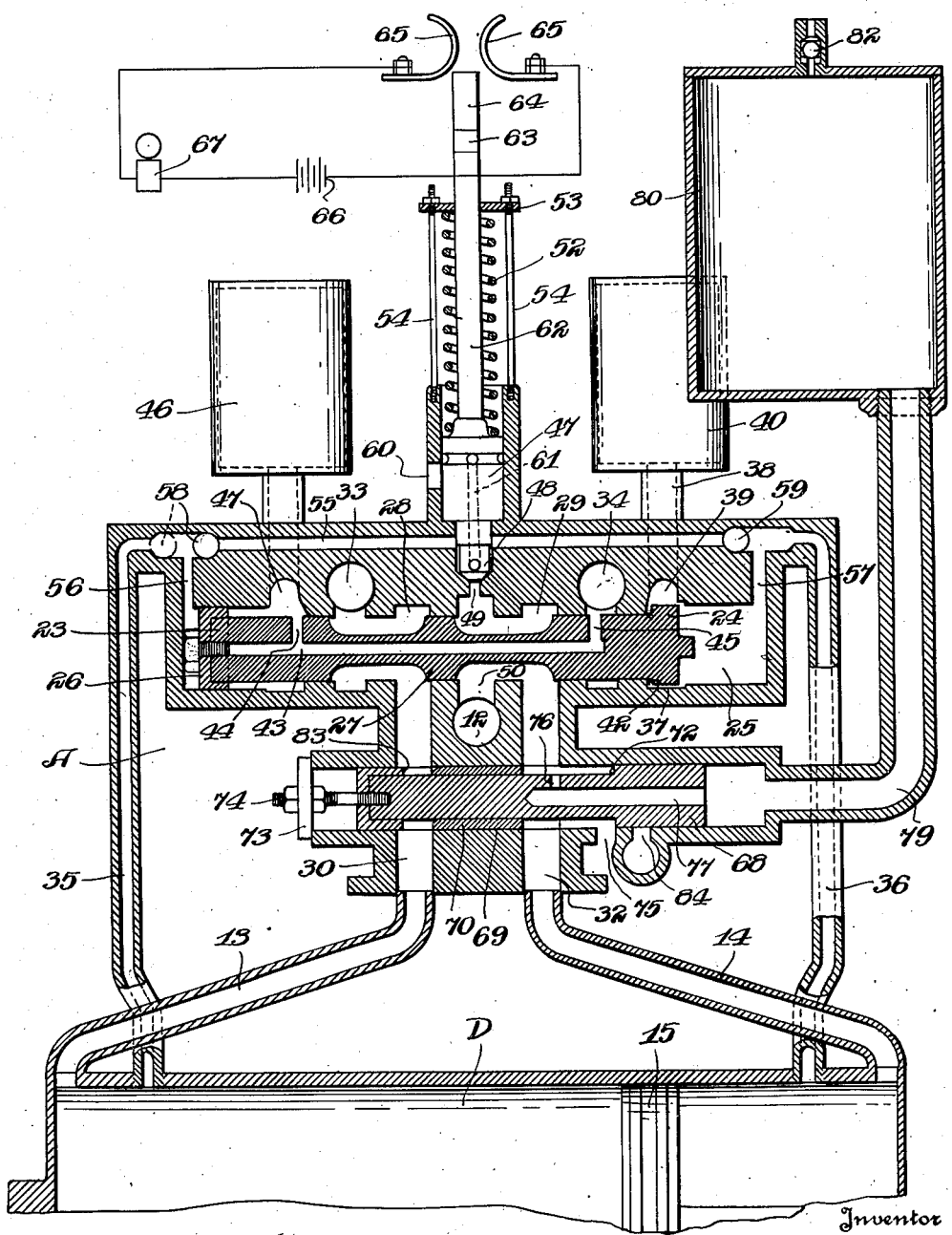
Fig. 9
Inventor
Harold S. Morton
Attorney Feb. 18, 1936.  H. S. MORTON  2,031,120
STOKER CONTROLLING DEVICE
Filed Feb. 15, 1932   6 Sheets-Sheet 6

Inventor
Harold S. Morton
By Howard Riehl
Attorney

Patented Feb. 18, 1936

2,031,120

UNITED STATES PATENT OFFICE 2,031,120

STOKER CONTROLLING DEVICE

Harold S. Morton, St. Paul, Minn., assignor to The Stott Stoker Company, St. Paul, Minn., a corporation of Delaware Application February 15, 1932, Serial No. 592,913

20 Claims. (Cl. 60—52).

This invention relates to an improvement in hydraulic operated means particularly adapted for use in the control of hydraulic plunger pistons such as are used for stokers to feed the fuel into the fire pot automatically. In hydraulic stoker controlling systems of this nature, it is very desirable to provide a means to prevent injury of the operating parts and to cause the same to function automatically to feed the coal or fuel and should any obstructions come for any reason, tending to stop the operation of the hydraulic plunger piston, the control system will automatically take care of the operation of the parts to prevent any damaging thereof, so that with my stoker controlling device, the fuel may be fed with perfect safety into the fire pot. Heretofore, different systems for controlling the feed of coal or fuel by hydraulic stokers have been carried out by variable speed motor means, or other variable speed means for driving the hydraulic pump, or other means of by-passing part of the pumped oil have been employed, all of which means have been used for the purpose of regulating the speed of the piston which operates the plunger for feeding the fuel into the fire pot.

My control system utilizes the entire pressure of the pumped oil at all times when it is in motion regardless of the speed of the coal feed, a feature which was not possible with the devices used heretofore, such as the by-passing systems. Furthermore, the motor operates at a constant speed in my system, regardless of the speed of the coal feed, which is accomplished by means of a control valve providing a period of rest at the end of each forward stroke of the piston when it is desired.

It is an object of my stoker controlling device to provide means for reversing the direction of the operating plunger which feeds the fuel to the fire pot automatically by hydraulic means rather than mechanically, thus equalizing the high working pressure from the pump to provide a more efficient operation. The movement of the piston to a particular point in the cylinder acts to equalize pressure on both sides of a reversing valve to permit a quantity of oil stored up during the piston stroke to force the reversing valve to a different position, thereby reversing the movement of the piston.

It is a feature of my hydraulic control system to provide an automatic pressure relief valve which opens a path to the exhaust for exceedingly high pressures and which acts to change the position of the reversing valve, thereby reversing the direction of the travel of the plunger piston automatically. Thus, when the stoker plunger is obstructed against traveling the full length for which it is set by some foreign object being embedded in the coal and in the path of the plunger, the pressure in the system builds up sufficiently to operate the pressure relief valve automatically, causing the direction of flow of oil to be reversed and the plunger and operating piston are thereby reversed.

In my stoker controlling device, the operating piston works in conjunction with a fuel feeding plunger which operates in a hopper to feed fuel automatically into the fire box of the furnace from the hopper. The operation of the stoker controlling device must be continuous and uniform to keep the fire desired in the boiler. It is often found that some foreign obstruction or article will lodge in the coal or fuel, such as a metal bolt, bar or some foreign member which is not of the same size or consistency as the fuel and thus will not carry through the hopper and plunger chamber readily. With my system, the stroke of the plunger in the base of the hopper may be automatically varied should an obstruction drop into the plunger operating chamber in the hopper, permitting the stoker to continue to operate with the plunger moving with a shorter stroke than is ordinarily set up and ofttimes this will permit the stoker to clear itself by the reciprocation of the plunger back and forth until the obstructing part is changed in position and is pushed on into the fire box. I have found my stoker to operate in this manner without injuring any of the parts, even though the stroke of the plunger has been materially shortened by such an obstruction.

A further object of my invention is to provide an alarm for the stoker which acts to give a warning when the stroke of the plunger and piston is shortened by an obstruction in the stoker mechanism. Thus, the operator may be readily notified that the coal feeding plunger is not making a full stroke and if desired the obstruction may be removed by the operator. My system includes valve means for regulating the number of strokes per minute of the operating piston which may be termed a metering valve adapted to determine the amount of oil flow through the system. The greater the discharge of oil through the opening regulated by this valve, the greater will be the interval of rest at the end of the cycle. This metering valve is provided with an indicator by means of which the same may be set to the desired operating position. In setting the metering valve, the operating piston may be held at rest for a longer or shorter period, thereby changing the speed of operation of the coal or fuel feeding plunger which is directly connected to the operating piston.

These features, together with other details and objects will be fully set forth in the specification and claims.

In the drawings forming a part of this specification:

Figure 1 is a diagrammatic view illustrating the application of my valve when used in conjunction with a plunger stoker.

Figure 2 is a top plan view of the oil tank and valve secured therein, the cover of the tank having been removed.

Figure 7 is a cross-sectional view on the line 7—7 of Figure 2, illustrating the control valve and metering valve used in conjunction therewith.

Figure 8 is a cross-sectional view through the oil supply port to the valve and the pressure relief valve taken on the line 8—8 of Figure 6.

Figure 9 is a diagrammatic cross-sectional view to illustrate the operation of my valve in conjunction with a plunger piston.

Figure 3:
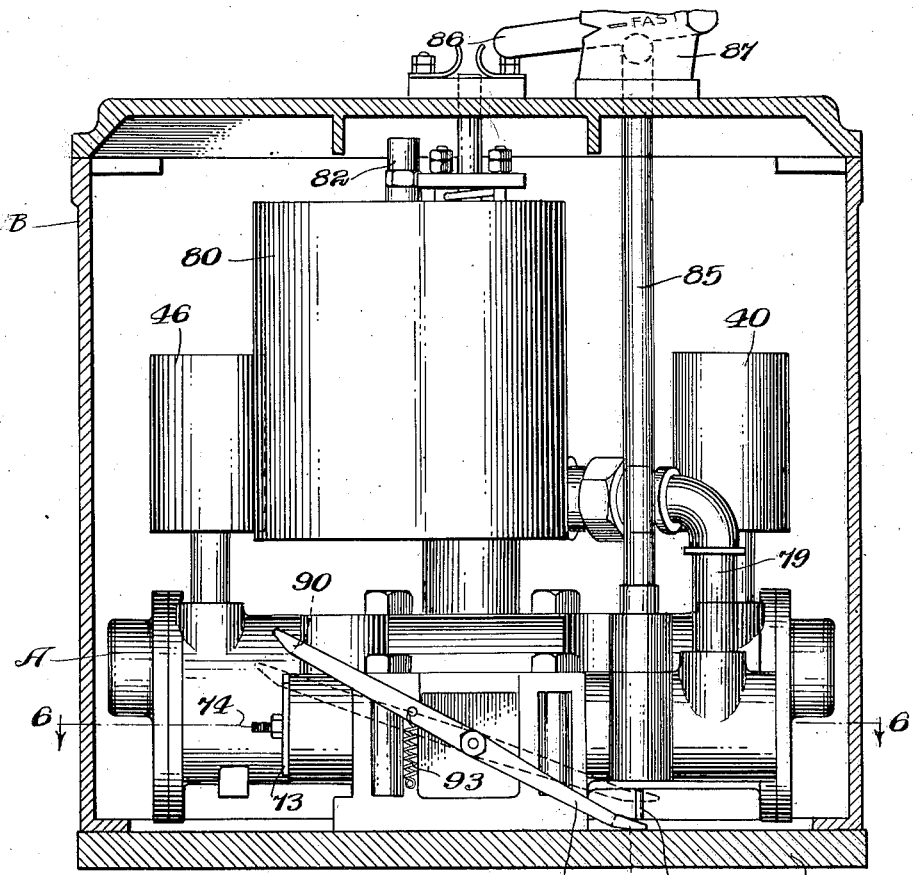
Figure 3 is a vertical section on the line 3—3 of Figure 2, illustrating a side elevation view of my valve.

My valve A is primarily adapted for use in controlling the flow of oil from the tank B forced by the pump C into the plunger cylinder D to force coal from the hopper E into the boiler or furnace F. Oil is taken from the tank B through the pipe 10 to the pump C. From the pump C, the oil is forced through the pipe 11 to the inlet port 12 of the valve A. From the valve A, the oil is pumped through the pipes 13 or 14 to one end or the other of the cylinder D. The oil pressure in the cylinder D on one side or the other of the piston 15 acts to reciprocate the piston 15 and causes the plunger 16 to reciprocate to feed fuel into the fire box 17 of the boiler F, forcing coal from the hopper E into the fire box 17 on each inward stroke. The pump C is driven by an electric motor 18 which also drives a fan 19 to provide a forced draft of air for the fire box 17. In ordinary installation, the standard 20 bearing the tank B, the valve within the tank B, the motor 18, the fan 19 and the pump C, is positioned alongside of the boiler F and the fan 19 forces air directly through the side of the boiler to the tuyère blocks in any desired manner. For the purpose of clearly illustrating my invention, however, I illustrate the standard 20 spaced from the boiler F and the draft from the fan 19 is conveyed through the conduit 22 to the tuyères of the boiler F.

As has been pointed out in the objects, my valve has three functions. My valve first acts as a reversing valve to automatically reverse the flow of oil through the pipes 13 and 14 to the cylinder D, so that when the piston 15 reaches one end or the other of its stroke, the direction of the piston travel is changed to cause the piston 15 to reciprocate back and forth within the cylinder D. The second function of my valve is to act as a pressure relief valve which operates to protect the stoker and valve mechanism from damage due to excess pressure built up when for any reason the movement of the piston within the cylinder D is obstructed. My valve acts to automatically reverse the direction of travel of the piston 15 in the cylinder D whenever excess pressure is built up in the oil line between the oil pump and the cylinder D. The third function of my valve A is to control the speed of the coal feed by providing a period of rest at the end of the inward stroke of the plunger. My valve is so arranged that the pump C may pump a constant volume of oil and my valve is so devised as to automatically provide an interval of rest for any length of time desired.

The entire valve A is within the tank B, in this way eliminating the need of stuffing boxes or packing rings about any movable projecting part extending from the valve A. The exhaust ports in my valve construction may be formed merely through the side of the valve casing and the need of exhaust pipes or connectors is eliminated. My construction also obviates the necessity of draining oil from the valve or disconnecting the oil line from the valve when repairs or adjustments on the valve are made. It is sometimes possible to make these adjustments or repairs without even draining the oil from the tank B.

The main valve 23 is in the form of a three lobe piston. The three lobes forming the valve 23 are held in spaced relationship by integral stems of somewhat reduced diameter from the diameter of the lobes. An end lobe 24 of greater diameter than the aforementioned lobes is provided on the valve 23 for shifting the position of the valve from one side of the valve cylinder 25 to the other. A similar and large lobe 26 is bolted to the other end of the valve 23.

The central lobe 27 of the valve 23 is for the purpose of cutting off the flow of oil entering through the intake port 12 from the pump C from first one and then the other of the annular recesses 28 and 29 connected with the ports 30 and 32 respectively of the pipes 13 and 14. When the valve 23 is in the extreme left hand position illustrated in Figure 9 of the drawings, oil entering from the pump C through the intake port 12 is free to be expelled from the valve A through the pipe 14, the lobe 27 preventing any of the oil from the pump from passing into the annular port 28 associated with the pipe 13. It is obvious that when the valve 23 is in its right hand position, the oil from the pump will be forced out through the pipe 13 and the pipe 14 is cut off from the pump pressure, tending to force the piston 15 within the cylinder D toward the right.

When the valve 23 is in the extreme right hand position illustrated in Figure 9, the oil from the pump C is tending to force the piston 15 to the left. The piston 15 forces the oil within the cylinder D to the left of the piston 15 out through the pipe 13 into the annular opening 28 and as may be seen, this oil may be exhausted from the valve A into the tank B through the exhaust port 33. In a similar manner, when the piston 15 is being forced toward the right, the oil to the right of the piston 15 will be forced through the pipe 14 and the valve 23 will be in such a position as to permit this oil to be exhausted through the exhaust port 34. Thus, during the movement of the piston 15 in either direction, oil from the pump is entering the cylinder D from one end thereof and the oil at the other end of the piston is forced out and exhausted into the tank B.

Near each end of the cylinder D is connected a control pipe. One control pipe 35 connects the cylinder D with the extreme end of the valve cylinder 25 and the other pipe 36 connects the cylinder D with the other extreme end of the valve cylinder 25. When the piston 15 is in the diagrammatic position illustrated in Figure 9 of the drawings and is being forced toward the left of the cylinder D, it may be seen that there is high pressure from the pump C through the pipe 36 and into the open portion of the valve cylinder 25 tending to hold the valve 23 securely to the left end of the cylinder 25. At the same time a narrow passage is opened to the annular chamber 37 which is slightly larger in diameter than the lobe 24 of the valve 23. The annular chamber 37 is connected by the pipe 38 and the port 39 to the air tank 40. The tank 40 is entirely closed with the exception of the opening through the pipe 38. The high pressure oil, however, acts to compress the air within the tank 40 and admit a quantity of oil which is held therein under pressure of the compressed air within the tank. When the piston 15 travels to a point near the left end of the cylinder D, the piston passes the opening of the pipe 35 and subjects this pipe to the high pressure from the pump C. Oil from the cylinder D is forced through the pipe 35 to the small space at the end of the valve 23. Thus, there is high pressure on both ends of the valve 23 and these pressures equalize one another. However, a small annular space 42 is provided between the body of the valve A and the lobe 24 of the valve 23. At this point when the pressure on each end of the valve 23 is equalized, the pressure of the oil within the tank 40 acts against the small area on the left hand side of the lobe 24 and acts to snap the valve 23 to the right. As the valve 23 is snapped to the right, the central lobe 27 cuts off the pipe 14 from the pump pressure and opens the pipe 13 to this high pressure, at the same time subjecting the pipe 14 to contact with the exhaust port 34. The piston 15 immediately starts to move toward the right within the cylinder D. The oil within the tank 40 provides sufficient pressure to hold the valve 23 in this right hand position until the piston 15 passes the opening of the pipe 35 into the cylinder D. At this time, high pressure is subjected to the space within the cylinder 25 at the left hand end of the valve 23 and acts to hold the valve securely to the right. When in this position, the oil within the tank 40 is drained through the longitudinal passage 43 and through the ports 44 and 45 in the valve 23, which connects the port 39 with the exhaust port 33 when the valve 23 is in right hand position. This drainage, however, is slow enough to insure the holding of the valve 23 in correct position until the piston 15 passes the opening of the pipe 35 to hold the valve 23 in position under high pressure. This slow leakage also prevents any bouncing back of the valve 23. This operation merely repeats itself when the piston 15 reaches the right hand end of the cylinder D. During the travel of the piston 15 to the right, the air tank 46 connected to the port 47 near the left hand end of the valve cylinder 25, is partially filled with oil compressing the air contained therein in the top portion of the tank. When the piston 15 passes the opening of the pipe 36, both ends of the valve 23 are again subjected to high pressure and the oil within the tank 46 under pressure acts in a manner hereinbefore described to force the valve 23 into the position illustrated in Figure 9. Oil is again introduced on the right hand side of the piston 15 and this piston starts in movement to the left.

My valve A will start reversing automatically regardless of the position of the valve 23 when the piston is stopped. It is obvious that if the valve 23 is to one side or to the other of the center, the pressure from the pump will enter the cylinder D on one side or another of the piston 15 and pressure through the control pipe 35 or 36 on the high pressure side of the piston, will act to force the valve 23 to its extreme position on one end or the other of the cylinder 25. There is sufficient clearance between one of the lobes 24 and 26 to allow leakage of oil from one end of the valve 23 even if this valve is in the exact center position. Leakage of oil either past the lobe 24 or the lobe 26 will act to slowly fill the tank 46 or 40 and when enough pressure is reached in either of these tanks, the valve 23 will be forced in one direction or the other.

In order that excessively high pressure from the pump C cannot damage the valve A or the stoker cylinder, or mechanism, I provide a pressure relief valve which acts automatically to reverse the valve A when the pump pressure becomes excessively high. My relief valve comprises a plunger piston valve 47 which is tapered at one end 48 so that only a small surface on the bottom of the same is subjected to the pump pressure through the port 49 connected with the annular chamber 50 adjacent the intake port 12. A spring 52 holds the valve 47 normally upon its tapered seat. The tension of the spring 52 may be regulated by changing the position of the plate 53 which is secured to the body of the valve A by studs 54. If the stoker plunger 16 is obstructed in some way, the movement of the piston 15 is stopped and the pressure of the oil being expelled by the pump C rises considerably. If this pressure becomes excessively high, the valve plunger 47 is raised against tension of the spring 52 until the passage 55 extending longitudinally of the valve A is exposed. The passage 55 is connected with the ports 56 and 57 which transmits the oil from the pipes 35 and 36 respectively to opposite ends of the valve cylinder 25. A ball check 58 is interposed between the passage 55 and the connection of the pipe 35 to the port 56, and a similar ball check 59 is interposed in between the passage 55 and the connection of the pipe 36 with the port 57. The ball checks 58 and 59 are normally in the position illustrated in full lines in Figure 9 of the drawings, closing each end of the passage 55, as there is zero pressure of oil within the passage 55 at the same time there is high pressure through one of the pipes 35 and 36 and exhaust pressure in the other of these pipes.

Even the exhaust pressure caused by the frictional resistance of the oil passing through the exhaust passages is greater than the zero pressure within the passage 55 and therefore, the ball checks 58 and 59 would normally be held against the end of the passage 55.

When the high pressure raises the plunger valve 47 and subjects the passage 55 to this high pressure, one of the ball checks 58 or 59 would not change position. For example, if the piston 15 were stopped in the position illustrated in Figure 9, and the pump C continued to pump oil into the valve A, there would be high pressure through the pipe 14 and also through the control pipe 36. Thus, there would be an equal high pressure on both sides of the ball check 59 and this ball would not move. The movement of the ball check 58 however, would only be hindered by exhaust pressure and accordingly, the ball 58 would be forced against the opening of the pipe 35, in the dotted position illustrated in Figure 9. Equally high pressure is then exerted upon both ends of the valve 23 and the force of the oil within the air tank 40 will act to throw the valve 23 to the right in exactly the same manner as though the piston 15 had reached the end of its stroke. The action of the valve 47 is very similar to the action of a pop valve as immediately upon leaving its seat, a much larger surface on the bottom of the valve is exposed to high pressure and the valve is forced upwardly rapidly. If for some reason, an extremely high pressure is reached within the valve A, the valve 47 is forced upwardly to a greater extent allowing oil to be expelled through the exhaust port 60 into the tank B. Until the valve 47 rises, the passage 61 therethrough forms an opening between the passage 55 and the tank B. Raising of the valve 47 closes the opening 61, as may be seen in Figure 8 of the drawings.

In order to notify the operator of the stoker that the plunger of the same has been obstructed, a rod 62 extends vertically from the valve 47. A section of insulating material 63 spaces the metal end 64 of the rod 62 from the remainder of the rod 62. When the valve 47 is forced upwardly, the metal end 64 extends between spring contacts 65 acting to close the circuit from the source of current 66 to an alarm bell 67 or some other type of electrical alarm. It sometimes happens that after automatically reversing several times because of an obstruction, the obstruction is carried out of the way or falls out of obstructing position and the stoker plunger 16 continues to act normally. Therefore, it is only when the alarm 67 continues to ring intermittently for a number of times that the stoker should be stopped and the obstruction removed.

Figure 13:
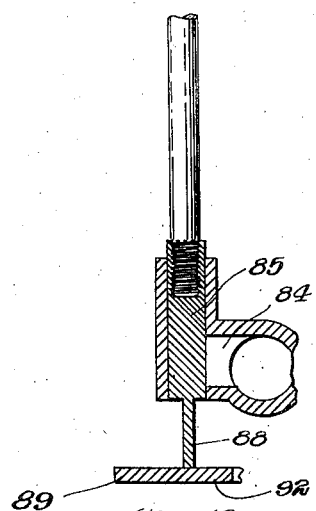
Figure 13 is a diagrammatic cross-sectional view on the line 13—13 of Figure 6, illustrating the metering valve used in conjunction with the control valve.
Figure 14:
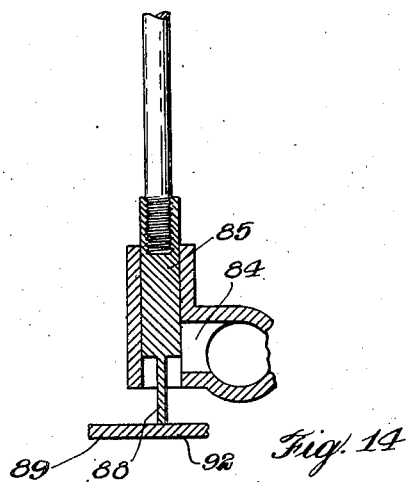
Figure 14 is a similar view to that shown in Figure 13, illustrating the metering valve in a slightly different position.

The control valve portion of my valve A is connected integrally with the main valve and pressure relief valve. The control valve 68 assumes three different positions during the cycle of the piston 15. The ports 30 and 32 in the valve A extend through the control valve cylinder 69 and a comparatively tight joint is formed between the sleeve 70 of brass or other bearing material and the valve 68 to prevent high pressure in one of the ports 30 or 32 from leaking through to the exhaust side. When the valve 23 is first placed in the position illustrated in Figure 9 of the drawings, the valve 68 is in the position illustrated in this figure and is held in this position by the high pressure acting against the annular surface 72 on the right hand lobe of the valve. The movement of the valve 68 to the right is limited by a plate 73 which is adjustably secured on the stud 74 on the left hand end of the valve 68. When the valve 68 is in the position illustrated in Figure 9, the pressure of the oil flowing through the intake port 12 from the pump C is free to be exhausted into the tank B through the exhaust port 75. It is obvious that as long as this exhaust port 75 is open, the piston 15 within the cylinder D will not move, as sufficient pressure is not built up behind this piston to move the same. As the oil flows through the exhaust port 75, however, a portion of the oil also flows through the passage 76 and through the passage 77 in the valve 68, flowing through the pipe 79 to the oil control tank 80. The tank 80 is provided at the top thereof with a check valve 82 which permits free passage of air within the tank to the outer atmosphere which closes when the tank 80 is filled, preventing any oil from escaping therethrough. As soon as the control tank 80 is filled with oil, the pressure in the tank 80 equalizes with the high pressure from the pump and as the pressure from the tank acts upon the entire end of the valve 68, while the pressure from the pump acts only upon the annular area 72, the valve 68 moves to the left as fast as oil passes through the opening 76 to displace the valve 68 until the opening 76 is just covered by the sleeve 70. It may be seen that further movement of the valve 68 to the left acts to greatly lower the pressure in the tank 80 and the force of the high pressure oil against the area 72 holds the valve 68 with the passage 76 just covered by the sleeve 70. When in this position, however, the exhaust port 75 is closed by the enlarged right end of the valve 68 and pressure from the pump acts upon the piston 15 within the cylinder D to force the same to the left. When the piston 15 reaches the left end of the cylinder D and reverses its direction, the port 32 is subjected to exhaust pressure while the port 30 is filled with oil of a high pressure. This high pressure oil within the port 30 acts upon the annular area 83 on the enlarged left end of the valve 68, forcing this valve 68 to the left extreme position of this valve. When in this position, an orifice 84 is opened. The size of the orifice opening depends upon the position of the metering valve 85 illustrated in Figures 13 and 14 of the drawings. As the valve 85 is raised, the area of opening of the orifice 84 is increased. As the tank 80 is above the level of the oil within the tank B, there is a tendency for the oil within this tank to drain. As the passage 76 is closed by the sleeve 70, the only escape for the oil within the tank 80 is through the orifice 84 and the amount of oil which will escape during the forward stroke of the piston depends upon the position of the metering valve 85. If the metering valve 85 is in the position illustrated in Figure 13 of the drawings, the orifice 84 is entirely closed and the tank 80 cannot drain during the forward stroke of the piston. Accordingly, when the main valve 23 reverses its position and the valve 68 is again forced into the position illustrated in Figure 9 of the drawings, no oil may be forced through the passage 76 as the tank 80 is already full. The pressure in the tank 80 accordingly equalizes with the pressure within the port 32 and the valve 68 immediately moves into its second position with the port 76 just closed by the sleeve 70 and the piston 15 begins its backward stroke without hesitation. If the orifice 84 is partially open, a part of the oil will drain from the tank 80 and the time required for refilling the tank 80 will depend upon the amount of oil which has been drained during the forward stroke of the piston. It may therefore be seen that the length of time which the piston 15 remains at the forward end of its stroke depends entirely upon the position of the metering valve 85. This valve 85 may be regulated vertically by a handle member 86 which is pivotally secured adjacent an indicator 87. The coal feed may be regulated from the full speed wherein no oil is drained from the tank 80 to slow speed wherein all of the oil is drained from the tank 80 during the forward stroke of the piston.

The bottom of the metering valve 85 is provided with a foot 88 which rests upon a pivoted lever 89. An arm 90 is formed at the other end of the lever 89 which is adapted to pivot down over the plate 73 as illustrated in dotted outline in Figure 3 of the drawings and the handle 86 is set to indicate stop on the indicator 87. When in this position, the lever 89 prevents the valve 68 from moving to the left and the exhaust port 75 is held open. Accordingly, as long as the handle 86 is set to indicate stop, the valve 68 is prevented from moving to close the exhaust opening 75 and the piston 15 will remain at rest indefinitely. As soon as the handle 86 is moved downwardly slightly, the arm 90 of the lever 89 will be pivoted out of contact with the plate 73 and the control valve 68 will be free to move to the right.

Figure 4:
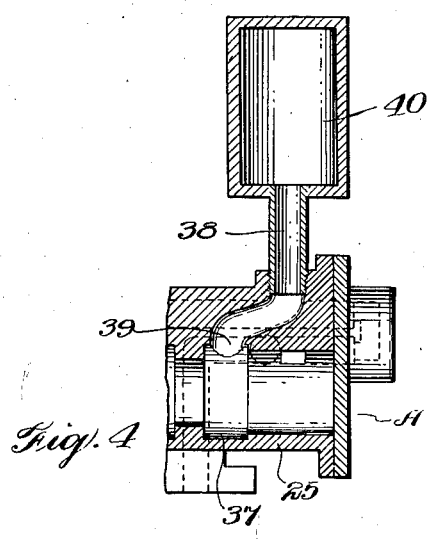
Figure 4 is a cross-sectional view on the line 4—4 of Figure 2, illustrating the connection of one of the air compression tanks to my valve.
Figure 5:
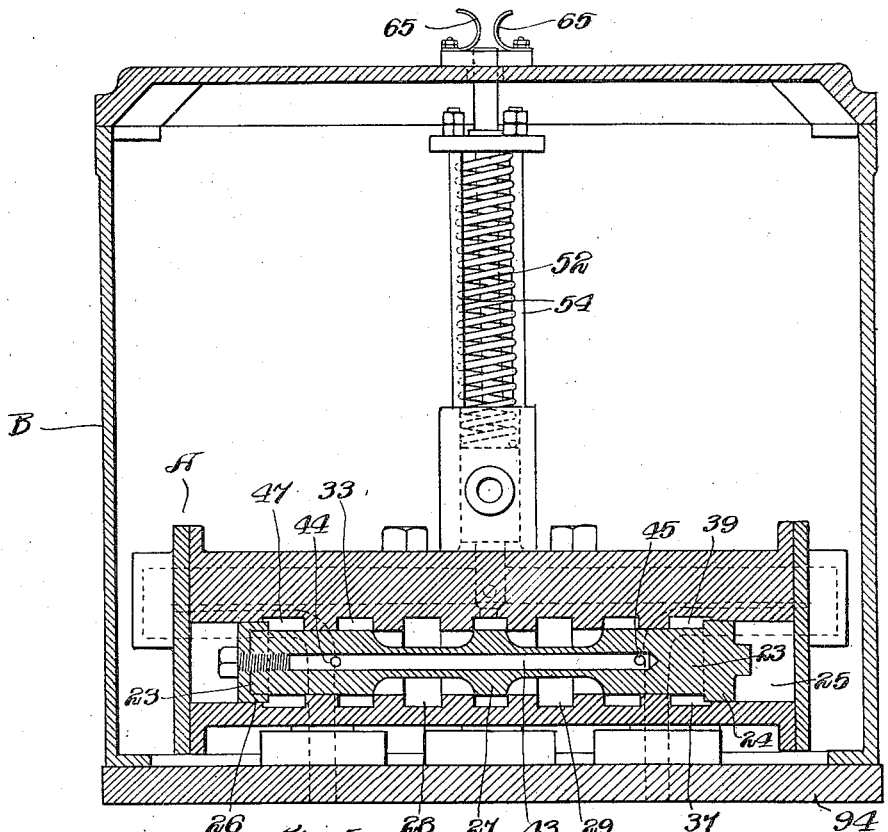
Figure 5 is a cross-sectional view on the line 5—5 of Figure 2, illustrating the construction of the main reversing valve and cylinder therefor.
Figure 6:
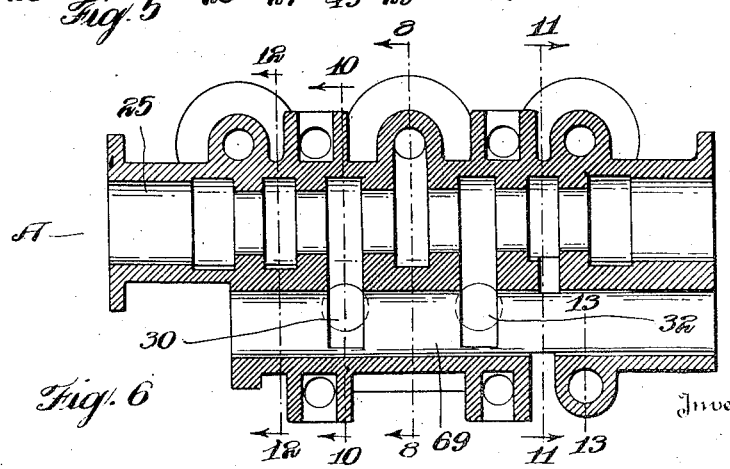
Figure 6 is a cross-sectional view on the line 6—6 of Figure 3, the valves having been removed from their cylinders.

The particular formation of my valve may be seen from the drawings. The plan view of Figure 2 illustrates the relative position of the oil tank 80 and the air compression tanks 40 and 46, with relation to the remainder of the valve A. Various sections through the valve A illustrate the position of the various elements of the valve. Figure 3 discloses the relative position of the air chambers and oil tanks and the distance which these various tanks extend above the top surface of the valve A. The true shape of the ports 39 and 47 may be seen in Figure 4 of the drawings. This view shows that the ports 39 and 47 are offset somewhat or in other words, the air compression tanks 40 and 46 are mounted on the valve casing at a point somewhat offset from the opening thereof into the valve cylinder 25. It would otherwise appear from Figure 3, that the tanks 40 and 46 were connected with the cylinder 25 closely adjacent the end thereof.

Figure 11:
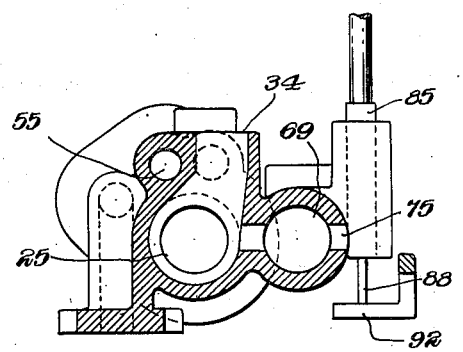
Figure 11 is a cross-sectional view on the line 11—11 of Figure 6.

Figure 7 is a true cross sectional view through the control valve 68 and cylinder 69 therefor. A part of the section in Figure 7 is taken on a plane parallel to the plane of the section through the control valve in order to illustrate the formation of the metering valve 85 which is mounted closely adjacent the control valve. The formation of this metering valve and the orifice 84 is more clearly disclosed in Figures 13 and 14 of the drawings. Figure 11 is a sectional view taken through the valve A closely adjacent the metering valve 85 and this valve may be seen in the background. This view also illustrates the foot 88 formed on the bottom of the metering valve 85 and a transversely extending ear 92 which is formed on the end of the lever 89. The lever 89 may be held against the foot 88 by a coil spring 93 if desired to ascertain that the ear 92 and the foot 88 will be in close contact at all times. Figure 11 also illustrates the exhaust port 75, as well as the exhaust port 34.

Figure 10:
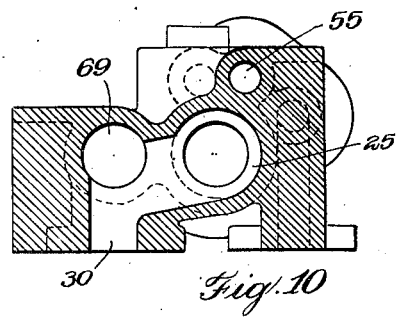
Figure 10 is a cross-sectional view on the line 10—10 of Figure 6.
Figure 12:
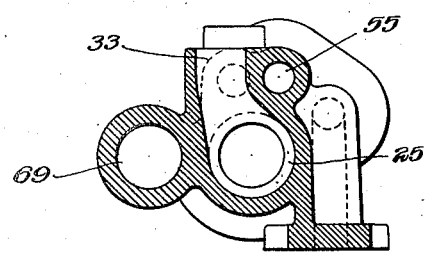
Figure 12 is a cross-sectional view on the line 12—12 of Figure 6.

The manner in which the oil from the valve cylinder 25 is directed to the cylinder D is illustrated in Figure 10. The port 30 may be clearly seen in this figure, and its relation with the control valve cylinder 69 and the main valve cylinder 25. The position of the passage 55 with relation to these cylinders may also be clearly seen in Figures 10, 11, and 12 of the drawings.

The location of the intake port 12 and the shape thereof may be seen in Figure 8 of the drawings. This cross sectional view also discloses the formation of the pressure relief valve 47. The passage 55 and the position of entry of the control pipe 35 is also disclosed in Figure 8, the latter appearing in dotted outline connecting the passage 55 with the bottom of the valve. It may be seen that when the valve A is secured to the base 94 of the tank B by means of bolts 95, all connections to the cylinder D and to the pump may be made directly from this bottom member 94 rather than from the valve itself so that when the bolts 95 are removed, the entire valve may be lifted from the tank B.

It may therefore be seen that my valve A will act to automatically reverse the direction of the piston 15 within the cylinder D at the end of each stroke. My valve also will act to automatically reverse the stroke of the piston 15 within the cylinder D when the plunger connected with this piston is obstructed in some manner. When the direction of the piston 15 is changed due to an obstruction, the operator of the stoker is notified by means of an alarm system. My valve also acts to relieve exceedingly high pressure to the exhaust in order to prevent any damage to the stoker mechanism. My valve A is so constructed that the piston 15 will remain motionless in the cylinder D a definite period of time controllable by a metering valve so that the feeding of coal from the hopper E to the fire box 17 of the boiler F may be regulated at will.

In accordance with the patent statutes, I have described the principles of operation of my stoker controlling device, and while I have endeavored to set forth the best embodiment thereof, I desire to have it understood that this is only illustrative of a means of carrying out my invention and that obvious changes may be made within the scope of the following claims without departing from the spirit of the invention.

I claim:

1. A hydraulic controlling system for a piston including, a cylinder in which said piston reciprocates, a supply tank for operating fluid, valve means immersed in said tank, a pump for forcing liquid from said tank to said valve under pressure, a fluid passage from said valve to said cylinder, means for regulating said valve to cause a flow of fluid through said valve from said tank through said conduit to said cylinder to reciprocate the same back and forth, and means inoperable under normal pressures in said valve for automatically relieving the abnormal pressure built up by the stopping of said piston by an obstruction.

2. A stoker controlling valve for hydraulically operated pistons including, a fluid supply, a pump connected thereto for supplying fluid under pressure, a reversing valve, a passage from said pump to said reversing valve, a piston cylinder, passages connecting said reversing valve and said cylinder, a by-pass from said first named passage to said reversing valve, a relief valve in said by-pass inoperable under normal pressures for automatically by-passing liquid to reverse said piston when an excess of pressure is built up by said pump.

3. A hydraulic control valve for furnace stokers in combination with a piston, a fluid supply tank, said valve being immersed in fluid in said tank, a pump for operating the fluid from said tank to said piston, means for continuously operating said pump, means in said valve for directing the flow of fluid from said tank to said piston to cause the piston to reciprocate in a manner to feed fuel to a furnace and means in said valve operable to direct fluid to said flow directing means adapted to cause said piston to automatically reverse its operation virtually instantaneously upon being obstructed in its direction of travel, and means for relieving excess pressure between said piston and said control valve to prevent damage to said valve and piston.

4. An automatic hydraulic control valve for reciprocating pistons including, valve means, a piston cylinder, passages connecting said valve with said cylinder, a source of constant and continuous fluid pressure connected with said valve to reciprocate said piston, means in said valve for automatically relieving excess pressure therein during the continuous and constant flow of hydraulic pressure through said valve, and means in said valve for automatically regulating the flow of hydraulic pressure through said passages to said piston to determine the number of strokes of said piston within a given period irrespective of the flow of fluid through said valve.

5. In combination, a hydraulic fluid supply tank, a control valve immersed in said tank, a piston adapted to be operated by the fluid from said tank, means for constantly and continuously circulating the fluid from said tank through said valve in a manner to reciprocate said piston automatically, and manually adjustable and hydraulically operated means in said valve for retarding the reciprocating movement of said piston irrespective of the constant and continuous flow of fluid to said valve.

6. A hydraulic controlling valve for reciprocating pistons in combination with a fluid supply tank, means for connecting said tank with said valve, a cylinder having a piston adapted to be hydraulically operated, means for connecting said piston with said valve, a fluid pump, means for continuously operating said pump to direct fluid pressure to said valve, means in said valve for causing said piston to automatically reverse at the end of each stroke to reciprocate the same in said cylinder automatically by the direction of said valve, means in said valve for relieving excess pressure therein built up by the obstruction of the operation of said piston, and means in said valve automatically shortening the stroke of said piston upon being obstructed permitting the piston to operate with a shorter stroke until the obstruction is removed, and means in said valve for regulating the speed of the operation of said piston irrespective of the flow of fluid from said pump to said valve.

7. A hydraulic control valve for reciprocating pistons including, a cylinder and piston connected to said valve, a source of constant and continuous fluid pressure connected to said valve, means in said valve for directing the constant fluid pressure in a manner to reciprocate said piston automatically back and forth, and manually adjustable and hydraulically operated means for regulating the number of strokes in a given period of time of said piston, irrespective to the source of fluid pressure to said valve.

8. A control valve for continuously operating hydraulic reciprocating pistons, a cylinder, a piston within said cylinder, means for connecting said cylinder to said valve, a source of fluid pressure continuously directed to said valve, means in said valve for directing the fluid pressure to said piston in a manner to reciprocate the same back and forth, means for automatically relieving the fluid pressure from said valve upon the obstruction of the reciprocation of said piston, means for automatically reversing the operation of said piston upon the obstruction of the movement thereof shortening the stroke of the piston, and means for regulating the flow of fluid pressure to said piston in a manner to retard the operation thereof to permit said piston to be automatically operated with a fast or slow cycle of operation and protected against stopping by obstructions.

9. A hydraulically operated stoker valve for furnaces including, a hydraulic cylinder and piston, a fluid supply tank connected to said cylinder to operate the same hydraulically, means for continuously pumping the fluid from said supply tank in a manner to operate the piston in said cylinder, an automatic master controlling valve adapted to control the operation of said piston including, means to relieve excess hydraulic pressure built up by the stopping of said piston, means to automatically reverse the stroke of said piston upon obstruction thereof, and means for regulating the flow of hydraulic pressure to said piston to control the speed of the cycle of operation of said piston, said master valve being entirely automatic.

10. In combination, a stoker valve for a furnace including, a hydraulic cylinder and piston, a fluid supply tank, a pump for directing fluid from said tank to said cylinder, means for continuously operating said pump and a control valve for the fluid from said supply tank having means for automatically causing said piston to reciprocate back and forth, means for automatically relieving excess pressure caused by stoppage of said piston, means for automatically changing the length of stroke of said piston by stoppage thereof, and means for regulating the speed of the cycle of operation of said piston by the setting of said valve to control the operation of the fluid from said tank to said cylinder.

11. A hydraulic master valve for directing the operation of a piston in a cylinder including, a body portion, valve means within said body portion, means for connecting said valve with a constant and continuous source of fluid pressure, means for regulating said valve means in said body by the position of said piston in said cylinder to automatically cause the piston connected with said valve to reverse at the end of each stroke, and adjustable hydraulically operated valve means within said body of said master valve to regulate the number of strokes of the piston within a given period, said means causing the piston to remain at rest for the desired period to give the desired number of strokes in a given period.

12. In combination, a hydraulic master control valve, a source of constant fluid pressure directed to said valve, a cylinder connected to said valve, a piston within said cylinder, means in said valve for automatically directing fluid pressure to cause said piston to normally move from one end to the other of said cylinder, means in said valve for automatically reversing the operation of said piston, means in said valve for automatically reversing the movement of said piston upon the obstruction of said piston to permit the piston to reciprocate with a shorter than normally full stroke, and means in said valve for timing the movement of said piston to regulate the number of strokes thereof within a given period.

13. In combination with a hydraulic control valve, a cylinder, a reciprocable piston therein, a pump for supplying oil to said valve, a reversing valve within said control valve, means for holding said reversing valve in one extreme position by the pressure of oil from the supply pump, means for equalizing the pressure at each end of said reversing valve at the end of each stroke of said piston, and hydraulic means for changing the position of the reversing valve when the pressure is equalized on both ends thereof to change the flow of oil from the supply pump to the opposite end of the cylinder.

14. In combination, with a control valve, a cylinder, a piston reciprocable therein, a reversing valve within said control valve, means for holding said reversing valve in one extreme position by the high pressure from said pump while the piston is traveling in one direction, means for building up a reserve oil pressure by said pump during the stroke of the piston, areas on said piston against which said reserve pressure may act, means for equalizing the pressure on both sides of the reversing valve at the end of the stroke of the piston, said pressure which has been built up acting against one of said areas to change the position of the valve to reverse the flow of oil from the supply pump to the opposite end of the cylinder.

15. In combination, with a hydraulic control valve, an oil supply pump for supplying fluid to said valve, a reciprocable piston controlled by said valve, a cylinder enclosing said piston, a slidable valve within said control valve, an oil reservoir, a passage for transmitting oil from said supply to said oil reservoir when said slidable valve is in one position, means for forcing said slidable valve in position to close said passage when said reservoir is filled, means for exhausting oil to allow said piston to remain at rest when said reservoir is being filled, means for conveying said oil from said pump to move said piston when said reservoir is filled, and means for exhausting a measured amount of oil from said reservoir to determine the interval of rest of said piston.

16. A hydraulic control valve for controlling the operation of a piston within a cylinder including, an oil supply, a reciprocable valve associated with said oil supply, an exhaust port adjacent said reciprocable valve, an oil reservoir, a by-pass to said oil reservoir whereby said reservoir is filled with oil by said supply means, a check valve on said reservoir to prevent the flow of oil through said reservoir when the same is full, the pressure within said reservoir equalizing with that of the supply to force said reciprocable valve in position to close said exhaust port, a metering valve, an orifice associated therewith, means for conveying the oil from the supply to said cylinder when said exhaust port is closed, and means for forcing said reciprocable valve to one extreme position hydraulically to uncover said orifice to said metering valve to permit oil to exhaust from said reservoir during one stroke of said piston.

17. A hydraulic control valve for controlling the movement of a reciprocable piston including, a supply means for delivering oil under pressure, a reciprocable valve in said control valve, an exhaust port adapted to be uncovered by said reciprocable valve, an oil reservoir, a by-pass in said reciprocable valve adapted to by-pass a part of said oil to said reservoir, the pressure built up by said oil in said reservoir moving said reciprocable valve to close said exhaust opening, means for conveying oil from said oil supply to move said piston in one direction when said exhaust opening is closed, a metering valve, an orifice associated therewith, and means for moving said reciprocable valve to uncover said orifice to permit a metered amount of oil to exhaust from said reservoir during one portion of the cycle of said piston.

18. A hydraulic control valve for reciprocable pistons including, a slidable reversing valve, a supply means for oil, means for conveying said supply pressure to one end of said reversing valve to hold the same in one extreme position during one stroke of said piston, means for conveying said pressure to the other end of said reversing valve at the end of said stroke of said piston, means for moving said reversing valve to the other extreme position when the pressure from said supply is equalized on both ends thereof, a plunger relief valve, means for conveying the pressure from said supply to equalize the pressure on both ends of said reversing valve when said pressure increases to reverse the movement of said piston.

19. In combination with a control valve, a cylinder, a reciprocable piston therein, a pump for supplying oil under pressure to said valve, a reversing valve, means for transmitting high pressure from said pump to one side of said reversing valve during one stroke of said piston, means for providing exhaust pressure at the other end of said reversing valve during said stroke, means for equalizing the pressure on both ends of said reversing valve at the end of said stroke, means for shifting said reversing valve when the pressure on both ends thereof is equalized, a relief valve operable when the pressure increases, means for transmitting oil pressure through said relief valve to equalize pressure on both ends of said reversing valve, whereby the movement of said piston is reversed by the changing of position of the reversing valve.

20. In combination, with a hydraulic cylinder and a reciprocable piston therein, a hydraulic control valve therefor, a pump for supplying oil thereto, a relief valve associated therewith operable when the pressure from said pump increases, means for reversing the direction of travel of said piston, a by-pass connecting said relief valve to said reversing means for said piston to reverse the direction of said piston when the pressure from said pump increases.

HAROLD S. MORTON.